(12) United States Patent
Tanaka et al.

(10) Patent No.: US 6,810,906 B2
(45) Date of Patent: Nov. 2, 2004

(54) FLOW CONTROL DEVICE

(75) Inventors: Satoshi Tanaka, Takasago (JP); Hideaki Emoto, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 59 days.

(21) Appl. No.: 10/393,948

(22) Filed: Mar. 24, 2003

(65) Prior Publication Data

US 2004/0020532 A1 Feb. 5, 2004

(30) Foreign Application Priority Data

Jul. 30, 2002 (JP) ........................................ 2002-220610

(51) Int. Cl.[7] ............................................... F16K 31/12

(52) U.S. Cl. ................ 137/487.5; 137/554; 251/129.04; 700/282

(58) Field of Search .............................. 137/487.5, 554; 251/129.04, 129.08; 73/168; 700/282, 289; 60/660; 324/207.18

(56) References Cited

U.S. PATENT DOCUMENTS

| 4,017,056 A | * | 4/1977 | Schwalenstocker et al. ................. 251/129.08 |
| 4,487,079 A | * | 12/1984 | Compton et al. ......... 73/862.52 |
| 5,109,675 A | * | 5/1992 | Hwang .......................... 60/660 |
| 5,322,003 A | * | 6/1994 | Winyard et al. .......... 91/363 A |

FOREIGN PATENT DOCUMENTS

JP            11-236824            8/1999

* cited by examiner

Primary Examiner—Ramesh Krishnamurthy
(74) Attorney, Agent, or Firm—Oblon, Spivak, McClelland, Maier & Neustadt, P.C.

(57) ABSTRACT

In a servo controller 3a, it is confirmed whether or not the voltages from amplifiers G1 through G3 are within the range of normal performance in the comparators 32a through 32c after alternating current voltages generated individually in a primary coil 22a and secondary coils 23a and 24a of an LVDT 2a are converted into direct current voltages and output from the amplifiers G1 though G3. When a voltage out of the range of normal performance is confirmed in at least one of the comparators 32a through 32c and a high voltage is output, the servo controller 3a is brought into a stand-by state.

7 Claims, 5 Drawing Sheets

FLOW CONTROL DEVICE

BACKGROUND OF THE INVENTION

1. Field of the Invention

The present invention, relates to a flow control device which includes a flow control valve in order to regulate the flow of a fluid. This present invention especially relates to a flow control device which has a linear variable differential transformer for detecting the lift of the flow control valve.

2. Description of the Prior Art

A flow control valve is installed to control the flow of a liquid. In order to detect the lift of the flow control valve, conventionally a position transmitter or the like is used. A position transmitter used for detection of the valve lift converts a vertical motion of a valve cylinder, which opens and closes the flow control valve, into a rotating motion and this rotating motion fluctuates the value of current flowing through a magnetic coil. By measuring the fluctuated current value, the position of the valve cylinder is detected.

However, in case of using the position transmitter, because the position is measured by converting the vertical motion of the valve cylinder into the rotating motion, the as-measured value is not a linear value in relation to the position of the valve cylinder. Therefore, precision in detecting the valve lift is inferior. Additionally, this rotating motion wears sliding portions such as the rotating shaft, bearings or the like, bringing about problems of a change of the rotation angle initially set at the time of installation and deterioration of the precision in detection.

In order to solve these problems, a "linear variable differential transformer" (LVDT) is used to detect the position of the valve cylinder by directly measuring the vertical motion of the valve cylinder. The internal configuration of a flow control device equipped with this LVDT is shown in FIG. 5. In FIG. 5, two LVDT's 100a and 100b are installed for a valve cylinder 1a which is included in a flow control valve 1. Here, the LVDT 100a is provided with an iron core 104a interlocking with the valve cylinder 1a and a primary coil 101a, a secondary coil 102a and a secondary coil 103a that are wound around the iron core 104a. Also, the LVDT 100b is provided with an iron core 104b interlocking with the valve cylinder 1a, a primary coil 101b and secondary coils 102b and 103b wound around the iron core 104b.

In the LVDT 100a, the secondary coils 102a and 103a are wound in inverse directions, and are series connected. The voltages generated at both ends of this series circuit of the secondary coils 102a and 103a are input into a servo controller 105a. At this time, an alternating current voltage is fed to the primary coil 101a by the servo controller 105a, generating induced voltages in the secondary coils 102a and 103a in accordance with the magnetic field generated by the primary coil 101a.

Then, as the iron core 104a moves inside the secondary coils 102a and 103a, the inductance of each of the secondary coils 102a and 103a varies, depending on the position of the iron core 104a. Since the coils are wound in inverse directions, the voltages generated in the secondary coils 102a and 103a respectively cancel each other and their differential voltage is input into the servo controller 105a. Likewise, in the LVDT 100b, the same operation as in the LVDT 100a is performed, so that the same differential voltage is input into the servo controllers 105a and 105b by the LVDT's 100a and 100b.

With this configuration, the differential voltages generated by the LVDT's 100a and 100b linearly express the position of the valve cylinder 1a, and precision in measuring the position of the valve cylinder 1a in accordance with the values detected from the differential voltages is improved. Additionally, in the servo controllers 105a and 105b, by comparing the differential voltages produced by each of the LVDT's 100a and 100b with the instruction signals transmitted from CPU 5 to specify the lift of the flow control valve 1 and by monitoring the results of the comparison, a switch SWa is changed over in accordance with the results of monitoring.

The switch SWa is a switch for selecting which of the servo controllers 105a and 105b gives a control signal to a servo valve 4 that regulates the lift of the flow control valve 1 and it is switched over in accordance with the results of monitoring of each of the servo controllers 105a and 105b. Specifically, when the results of the comparison of the servo controllers 105a and 105b are different from each other and either of the servo controllers 105a and 105b is presumed to be at fault, switching over is controlled so that the servo valve 4 is given a control signal by the servo controller that is presumed not to be at fault.

However, when an LVDT is installed as shown in FIG. 5, for example, when the primary coil is broken, resulting in no flow of electric current through the coil, electric current is not induced in the secondary coil, and as a result, no current flows through the secondary coil. Thus, a differential voltage equivalent to that produced when the iron core is located in the center is given to the servo controller, causing the servo valve 4 to perform erroneously. In this way, depending on the state of the LVDT failure, a differential voltage within the normal range is sometimes given to the servo controller, which causes the flow control valve 1 to perform erroneously and move in a wrong direction.

Therefore, as in FIG. 5, even though feedback control is performed by two systems that use the LVDT's 100a and 100b and even though the LVDT's perform feedback control by utilizing one of the two systems that is operating normally, the operation actually performed may not always be normal but erroneous. Especially, in case of a flow control valve controlling the supply of fuels to a combustor which is used for a gas turbine, an erroneous operation makes an excessive amount of fuel flow into the combustor, which causes the temperature in the combustor to become dangerously high, thus finally leading to breakdown of the combustor.

In order to deal with the above-mentioned problem, an example of a control device is proposed in the Japanese Patent Application Laid-Open No. 2001-29118. In this publication, a fault is detected by checking the added values of the voltages generated in each of the secondary coils. However, the voltage of each of the secondary coils is not checked.

SUMMARY OF THE INVENTION

It is an object of the present invention to provide a flow control device which can detect a fault in a linear variable differential transformer that detects the lift of a flow control valve.

To achieve the above-mentioned object, in accordance with the present invention, a flow control device includes: a flow control valve controlling the flow of a fluid; first and second linear variable differential transformers that are equipped with a core moving in the same direction as the cylinder of the flow control valve and which detect the position of the valve cylinder; first and second servo controllers which generate control signals controlling the lift of the flow control valve based on signals detected individually by the first and the second linear variable differential transformers; and a switch which selects one of the control signals output individually from the first and the second servo controllers and supplies it to the flow control valve;

wherein the first and the second linear variable differential transformers each include: the core; a primary coil which is supplied with an alternating current voltage; two, first and second, secondary coils connected in parallel where voltages are included in accordance with the position of the core when said primary coil is energized with a voltage;

wherein the first servo controller monitors the voltages generated in the primary coil, the first secondary coil and the second secondary coil provided in the first linear variable differential transformer respectively; the second servo controller monitors the voltages generated in the primary coil, the first secondary coil and the second secondary coil provided in the second linear variable differential transformer respectively; while the control signal from the first servo controller is being selected by the switch, the switch stops selecting the control signal from the first servo controller on confirming that at least one of the primary coil, the first secondary coil and the second secondary coil provided in the first linear variable differential transformer outputs a voltage out of the range of normal performance; and while the control signal from the second servo controller is being selected by the switch, the switch stops selecting the control signal from the second servo controller on confirming that at least one of the primary coil, the first secondary coil and the second secondary coil provided in the second linear variable differential transformer outputs a voltage out of the range of normal performance.

BRIEF DESCRIPTION OF THE DRAWINGS

These and other aims and natures of the present invention, in accordance with the preferred embodiments, is more particularly described in the following detailed description taken in conjunction with the preferred embodiments with reference to the accompanying drawings in which.

DESCRIPTION OF THE PREFERRED EMBODIMENTS

Figure 1:
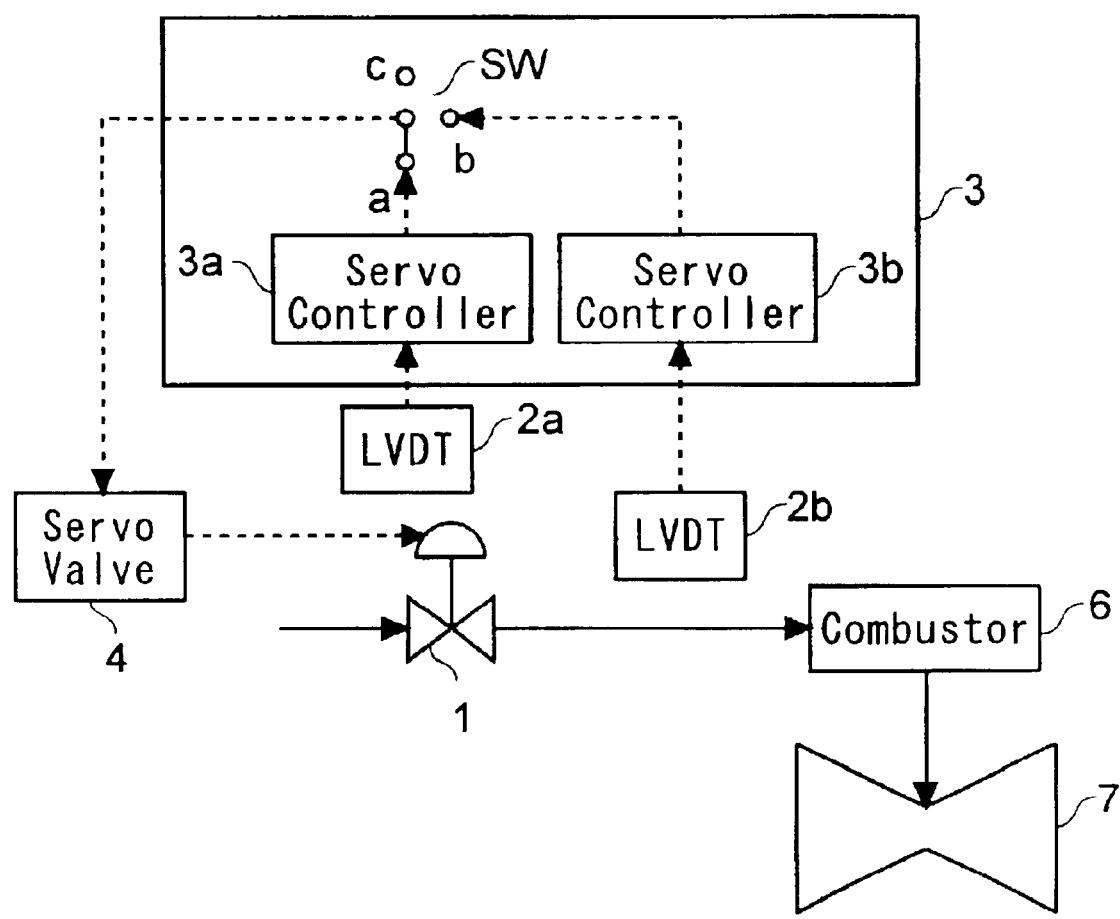
FIG. 1 is a block diagram showing the configuration of a gas turbine system including a flow control device embodying the present invention.
Figure 2:
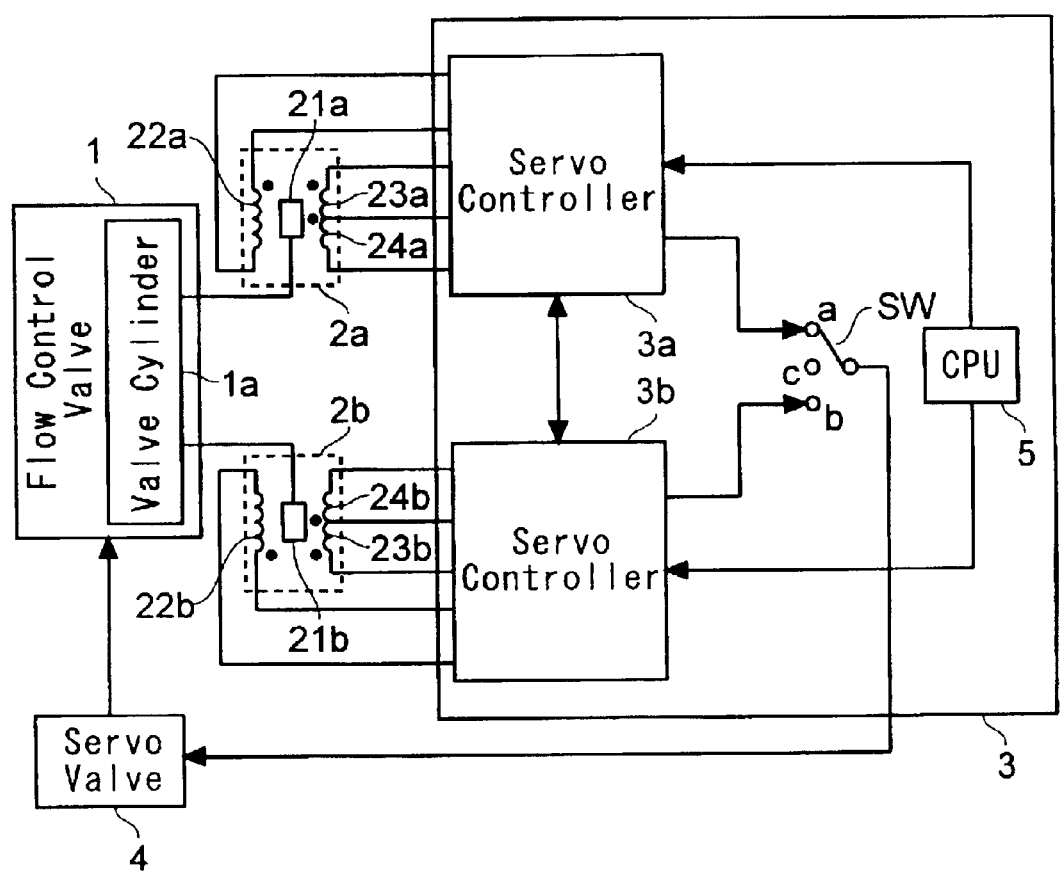
FIG. 2 is a block diagram showing the configuration of the flow control device embodying the present invention.

Referring now to the drawings, an embodiment of the present invention will be described hereinafter. The embodiment of the present invention will be explained by giving an example of a flow control device which controls the amount of fuel to be supplied to a combustor of a gas turbine. FIG. 1 is a block diagram showing the relationship between the gas turbine and the flow control device. FIG. 2 is a block diagram showing the relationship among different portions of the flow control device.

As shown in FIG. 1, the amount of fuel supply is controlled by a flow control valve 1 and when the fuel is supplied to a combustor 6, combustion gas burnt by the combustor 6 rotates a gas turbine 7. When the lift of the flow control valve 1 is detected by linear variable differential transformers (LVDT's) 2a and 2b, which will be described later, the detected values are supplied to servo controllers 3a and 3b provided in a control device 3. By operating a servo valve 4 based on the detected values, the lift of the flow control valve 1 is controlled.

The flow control device shown in FIG. 2 has the flow control valve 1 which sets the amount of fuel supply, the LVDT's 2a and 2b which detect the lift of the flow control valve 1, the servo controllers 3a and 3b to which the values detected by the LVDT's 2a and 2b are supplied, the servo valve 4 which controls the lift of the flow control valve 1, a CPU 5 which transmits instruction signals specifying the lift of the flow control valve 1 to the servo controllers 3a and 3b and a switch SW which selects a control signal to be supplied to the servo valve 4. Here, the servo controllers 3a and 3b, CPU 5 and the switch SW together constitute the control device 3.

Figure 3:
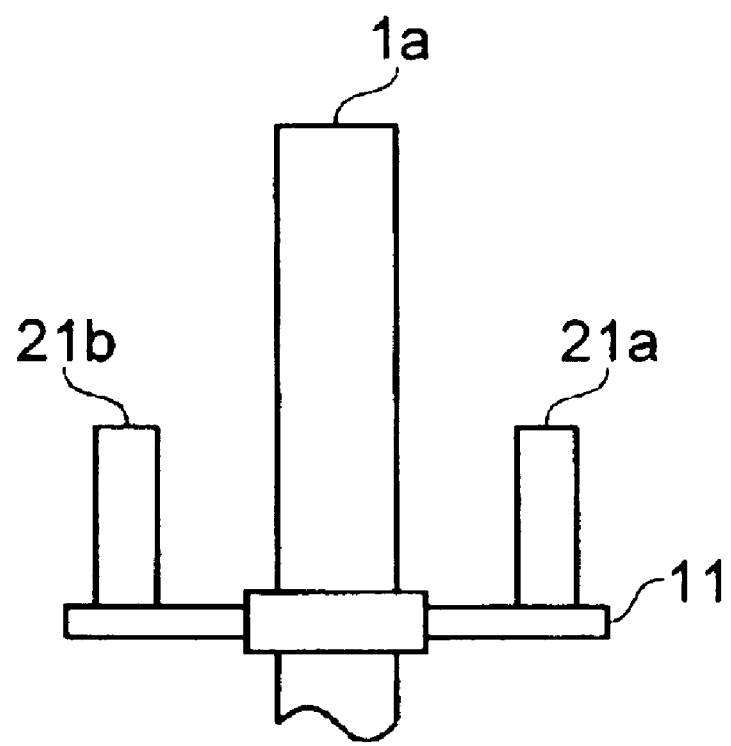
FIG. 3 is a schematic structure diagram showing the relationship between the flow control valve and the iron cores shown in FIG. 2.

The LVDT 2a is composed of a primary coil 22a and secondary coils 23a and 24a which are wound around an iron core 21a interlocking with a valve cylinder 1a of the flow control valve 1, and the LVDT 2b is composed of a primary coil 22b and secondary coils 23b and 24b wound around an iron core 21b interlocking with the valve cylinder 1a of the flow control valve 1. Moreover, as shown in FIG. 3, the iron cores 21a and 21b are fitted to the valve cylinder 1a by way of a support 11, and by interlocking with the vertical movement of the valve cylinder 1a, the iron cores 21a and 21b move vertically.

Figure 4:
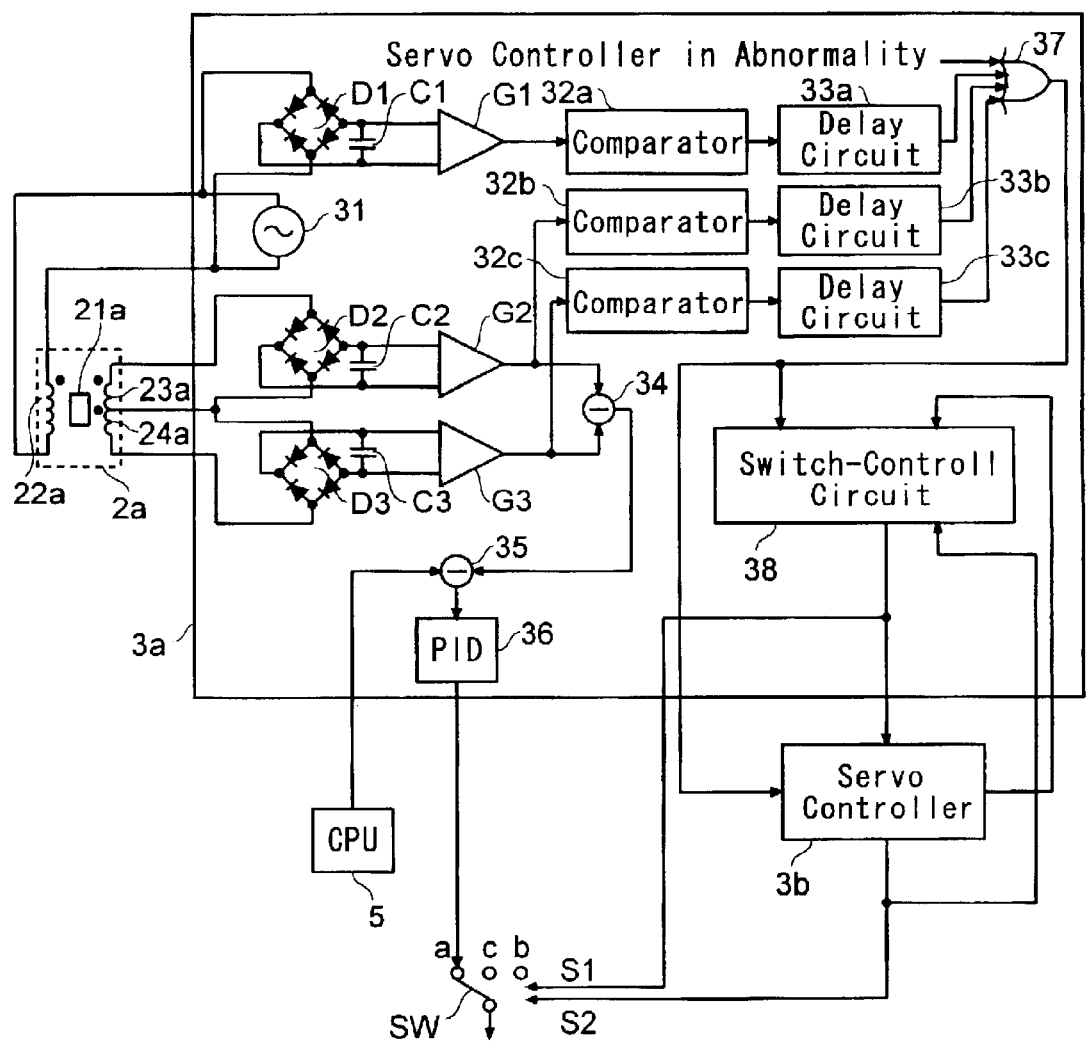
FIG. 4 is a block diagram showing the internal configuration of the servo controller shown in FIG. 2.
Figure 5:
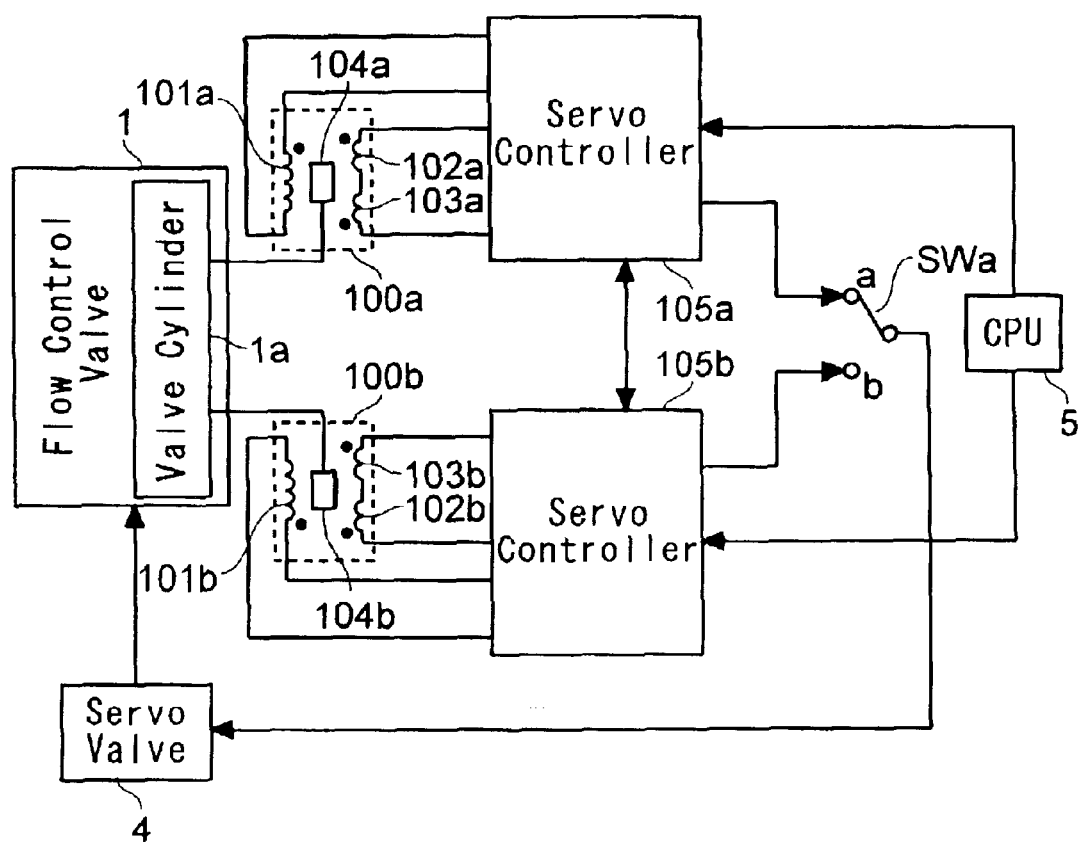
FIG. 5 is a block diagram showing the configuration of a conventional flow control device.

Moreover, the servo controllers 3a and 3b are configured as shown in FIG. 4. Because the servo controllers 3a and 3b are of the same configuration, only the servo controller 3a will be explained herein as a representative.

The servo controller 3a is equipped with an oscillator 31 which supplies a high-frequency electric current to the primary coil 22a; rectifying circuits D1 through D3 that rectify alternating current voltages of the primary coil 22a and the secondary coils 23a and 24a respectively; smoothing capacitors C1 through C3 that smooth the voltages rectified by the rectifying circuits D1 through D3; amplifiers G1 through G3 that amplify the direct current voltages smoothed by the smoothing capacitors C1 through C3; comparators 32a through 32c that compare the output voltages from the amplifiers G1 through G3 to determine whether they are within the range of normal performance or not; delay circuits 33a through 33c which delay the signals transmitted from the comparators 32a through 32c; a subtracting circuit 34 which obtains the difference between the output voltages from the amplifiers G2 and G3; another subtracting circuit 35 which obtains the difference between the output voltage from the subtracting circuit 34 and an instruction signal from CPU5; a control-signal generating circuit 36 that produces a control signal by receiving the output from the subtracting circuit 35; an OR circuit 37 which is fed with the outputs from the delay circuits 33a through 33c and a signal indicating a fault in the servo controller 3a; and a switch-control circuit 38 which changes over the switch SW by being fed with the output from the OR circuit 37 and the output from the OR circuit 37 provided in the other servo controller 3b.

Now, the operation of the LVDT's 2a and 2b and the servo controllers 3a and 3b configured as described will be explained by describing the LVDT 2a and the servo controller 3a as representatives. When a high-frequency current is supplied to the primary coil 22a by the oscillator 31, alternating current voltages are produced in the secondary coils 23a and 24a by being induced by the voltage that energizes the primary coil 22a. At this time, in accordance with the position of the iron core 21a, the value of the alternating current voltages that are generated in the secondary coils 23a and 24a varies and when the center of the iron core 21a is located in the joint portion of the secondary coils 23a and 24a, the inductances of the secondary coils 23a and 24a are equal, so that the alternating current voltages produced in the secondary coils 23a and 24a are equal.

The voltage energizing the primary coil 22a is converted into a direct current voltage by the rectifying circuit D1 and the smoothing capacitor C1 and supplied to the amplifier G1. Moreover, the voltage induced in the secondary coil 23a is converted into a direct current voltage by the rectifying circuit D2 and the smoothing capacitor C2 and supplied to the amplifier G2, and the voltage induced in the secondary coil 24a is also converted into a direct current voltage by the rectifying circuit D3 and the smoothing capacitor C3 and supplied to the amplifier G3. The direct current voltages amplified by the amplifiers G1 through G3 are supplied to the comparators 32a through 32c to determine whether they are within the specified range of voltages or not. Here, the range of voltages referred to by the comparator 32a is from Va to Vb, and the range of voltages referred to by the comparators 32b and 32c is from Vc to Vd (0<Vc<Va and Vd>Vb). These ranges of voltages from Va to Vb and from Vc to Vd will hereinafter be called the ranges of normal voltages.

In the comparators 32a through 32c, when the output voltages from the amplifiers G1 through G3 are within the range of normal voltages, they are regarded as normal and the output voltages of the comparators 32a through 32c are set as "Low." However, when the output voltages from these amplifiers G1 through G3 are out of the range of normal voltages, they are regarded as abnormal and the output voltages the comparators 32a through 32c are set as "High." After the output voltages from these comparators 32a through 32c are delayed for a specified period of time by the delay circuits 33a through 33c, they are input into the OR circuit 37.

Specifically, when a short circuit occurs in the primary coil 22a, the voltage energizing the primary coil 22a is zero volt, so that the amplifier G1 outputs zero volt, and thus a fault is recognized in the comparator 32a, turning the output of the delay circuit 33a "High." On the other hand, when a wire breakage occurs in the primary coil 22a, the primary coil 22a is not energized, and thus the secondary coils 23a and 24a are not induced electro-magnetically, resulting in the output of zero volt from the amplifiers G1 through G3. In consequence, a fault is recognized in the comparators 32a through 32c, turning the outputs of the delay circuits 33a through 33c "High."

Likewise, when a short circuit or a wire breakage occurs in the secondary coil 23a, no induced voltages are generated in the secondary coil 23a, so that the output of the amplifier G2 is zero volt, and thus a fault is recognized in the comparator 32b, turning the output of the delay circuit 33b "High." Likewise, when a short circuit or a wire breakage occurs in the secondary coil 24a, no induced voltages are generated in the secondary coil 24a, so that the output of the amplifier G3 is zero volt, and thus a fault is recognized in the comparator 32c, turning the output of the delay circuit 33c "High."

The output voltages from the amplifiers G2 and G3 are supplied to the subtracting circuit 34, where the output from the amplifier G3 is subtracted from the output from the amplifier G2. The voltage obtained by the subtracting circuit 34 is fed to the subtracting circuit 35 as the value detected by the LVDT 2a to determine the lift of the flow control valve 1. Subsequently, in the subtracting circuit 35, the output from the subtracting circuit 34 is subtracted from the voltage of the instruction signal supplied by CPU 5 and in this way the parameter on the basis of which to control the lift of the flow control valve 1 is obtained.

Thereafter, the output voltage from the subtracting circuit 35 is supplied to the control-signal generating circuit 36, where the control signal for PID feedback control is generated with differential components and integral components added thereto on the basis of the output from the subtracting circuit 35. This control signal is supplied to the servo valve 4 by way of the switch SW so that the lift of the flow control valve 1 is controlled to be close to the value specified by the instruction signal from CPU 5.

Moreover, the outputs from the above-mentioned delay circuits 33a through 33c and a signal indicating a fault in the servo controller 3a are input into the OR circuit 37. The signal indicating a fault in the servo controller 3a is "High" when the servo controller 3a is operating abnormally, while it is "Low" when the servo controller 3a is operating normally. Therefore, when one of the outputs from the delay circuits 33a through 33c and the signal indicating a fault in the servo controller 3a is "High", a "High" signal is output from the OR circuit 37. In other words, when a fault is detected in any of the primary coil 22a, the secondary coils 23a and 24a and the servo controller 3a, a "High" signal is output from the OR circuit 37.

Then, the output from this OR circuit 37 is supplied to the switch-control circuit 38 as an fault-detecting signal S1, and at the same time, the output from the OR circuit 37 provided in the servo controller 3b is fed to the switch-control circuit 38 as the fault-detecting signal S2. These fault-detecting signals S1 and S2 are also fed to the switch-control circuit 38 provided in the servo controller 3b. Moreover, the switch-control circuit 38 provided in the servo controller 3a is "ON" when the servo valve 4 is controlled by the servo controller 3a and the servo controller 3b is in a stand-by state. On the other hand, when the servo valve 4 is controlled by the servo controller 3b and the servo controller 3a is in a stand-by state, the switch-control circuit 38 provided in the servo controller 3a is in an "OFF" state.

When the servo valve 4 is controlled by the servo controller 3a and the switch-control circuit 38 is ON and in addition the fault-detecting signal S1 is "Low," a control signal from the control-signal generating circuit 36 provided in the servo controller 3a is supplied to the servo valve 4 with the switch SW left connected to the contact a. When the fault-detecting signal S1 is "High," if the abnormality-detecting signal S2 is "Low," a control signal from the control-signal generating circuit 36 provided in the servo controller 3b is supplied to the servo valve 4 with the switch SW connected to the contact b. At this time, the switch-control circuit 38 provided in the servo controller 3b is turned "ON" by being fed with a signal and the switch-control circuit 38 provided in the servo controller 3a is turned "OFF".

When the fault-detecting signal S1 is "High" and the fault-detecting signal S2 is also "High," the switch SW is connected to the contact c so as to prevent control signals from the servo controllers 3a and 3b from being supplied to the servo valve 4 and to stop the control operation of the flow control valve 1, so that the flow control valve 1 does not open in a dangerous direction. At this time, the flow control valve 1 is instantaneously closed by dumping the emergency trip oil.

Moreover, when the servo controller 3a is in a stand-by state and the switch-control circuit 38 is OFF and in addition the fault-detecting signal S2 is "High" and the fault-detecting signal S1 is "Low," the switch-control circuit 38 provided in the servo controller 3a is turned ON by being fed with a signal by the switch-control circuit 38 provided in the servo controller 3b and additionally a control signal from the servo controller 3a is supplied to the servo valve 4.

As described above, in accordance with the embodiment of the present invention, two systems each including an LVDT and a servo controller are installed in a feedback control system for controlling the flow, and when a fault occurs in either of the two systems, feedback control is executed to control the flow by utilizing one system which is operating normally. When a fault occurs in both systems, fuel supply is stopped by cutting off the wire transmitting a control signal to the servo valve and by dumping the emergency trip oil from the flow control valve. Consequently, as shown in FIG. 1, when the flow control device of the present invention is utilized for the flow control of fuels supplied to the combustor of a gas turbine, the fuel supply to the combustor can be monitored safely.

Although the flow control device in accordance with the embodiment of the present invention has been explained herein as a device for controlling the flow of fuels in the gas turbine system, the present invention is applicable not only to a gas turbine system but also to any other systems.

In accordance with the embodiment of the present invention, by monitoring, by the use of a servo controller, the voltages generated in each of the primary coil and the first and the second secondary coils that are provided in a linear variable differential transformer, it is possible to check whether the linear variable differential transformer is operating normally or not, which makes it possible to check the state of the linear variable differential transformer easily and reliably. Accordingly, by using two such feedback control systems each including a linear variable differential transformer and a servo controller, the flow can be controlled by the system which is operating normally and thus it is possible to safely operate the entire system utilizing the flow control device.

What is claimed is:

1. A flow control device including:
   a flow control valve controlling a flow of liquid;
   first and second linear variable differential transformers which are equipped with a core moving in a same direction as a cylinder of said flow control valve and which detect a position of said valve cylinder;
   first and second servo controllers generating control signals to control a lift of said flow control valve based on signals detected individually by said first and second linear variable differential transformers; and
   a switch selecting one of the control signals output individually from said first and second servo controllers so that the selected control signal is supplied to said flow control valve;
   wherein said first and second linear variable differential transformers each comprise:
   said core;
   a primary coil fed with an alternating current voltage; and
   two, first and second, secondary coils, connected in parallel, where voltages are induced in accordance with the position of said core when said primary coil is energized with a voltage;
   wherein said first servo controller monitors voltages which are generated individually in said primary coil, said first secondary coil and said second secondary coil provided in said first linear variable differential transformer, and said second servo controller monitors voltages generated individually in said primary coil, said first secondary coil and said second secondary coil provided in said second linear variable differential transformer; and
   while the control signal transmitted from said first servo controller is being selected by said switch and when it is confirmed that at least one of said primary coil, said first secondary coil and said second secondary coil provided in said first linear variable differential transformer outputs a voltage out of a range of normal performance, said switch stops selecting the control signal from said first servo controller; and
   while the control signal transmitted from said second servo controller is being selected by said switch and when it is confirmed that at least one of said primary coil, said first secondary coil and said second secondary coil provided in said second linear variable differential transformer outputs voltage out of a range of normal performance, said switch stops selecting the control signal from said second servo controller.

2. A flow control device as claimed in claim 1,
   wherein said first and second servo controllers each include:
   a first rectifying-and-smoothing circuit rectifying and smoothing an alternating current voltage generated in said primary coil;
   a second rectifying-and-smoothing circuit rectifying and smoothing an alternating current voltage generated in said first secondary coil;
   a third rectifying-and-smoothing circuit rectifying and smoothing an alternating current voltage generated in said second secondary coil;
   first through third comparators, each of which generates a "low" voltage when a direct current voltage output from one of said first through third rectifying-and-smoothing circuits respectively is within a range of normal performance and generates a "high" voltage when the direct current voltage output from one of said rectifying-and-smoothing circuits respectively is out of the range of normal performance; and
   an OR circuit into which outputs from said first through third comparators are input;
   wherein, when the control signal transmitted from said first servo controller is being selected by said switch and when an output from said OR circuit provided in said first servo controller is "High," said first servo controller is brought into a stand-by state, and furthermore, when an output from said OR circuit provided in said second servo controller is "Low," said switch is changed over so as to select the control signal from said second servo controller; and
   wherein, when the control signal transmitted form said second servo controller is being selected by said switch and when the output from said OR circuit provided in said second servo controller is "High," said second servo controller is brought into a stand-by state, and furthermore, when the output from said OR circuit provided in said first servo controller is "Low," said switch is changed over so as to select the control signal from said first servo controller.

3. A flow control device as claimed in claim 2, wherein, when the outputs from both of said OR circuits provided in said first and second servo controllers are high, emergency trip oil supplied to said flow control valve is dumped to close valve.

4. A flow control device as claimed in claim 2, wherein said first and second servo controllers each further include:

a subtracting circuit which determines a difference value between direct current voltages output from said second and third rectifying-and-smoothing circuits, wherein the lift of said flow control valve is detected based on the difference value determined by said subtracting circuit.

5. A flow control device as claimed in claim 4, wherein, when the outputs from said OR circuits provided in said first and second servo controllers are high, emergency trip oil supplied to said flow control valve is dumped to close valve.

6. A flow control device as claimed in claim 4, wherein said first and second servo controllers each further include:

a control-signal generating circuit which produces said control signal based on a value obtained by comparing an instruction signal specifying a lift of said flow control valve with the difference value determined by said subtracting circuit.

7. A flow control device as claimed in claim 6, wherein, when the outputs of said OR circuits provided in said first and second servo controllers are both high, emergency trip oil supplied to said flow control valve is dumped to close valve.

* * * * *